(12) United States Patent
Jeong et al.

(10) Patent No.: US 9,112,874 B2
(45) Date of Patent: Aug. 18, 2015

(54) METHOD FOR IMPORTING DIGITAL RIGHTS MANAGEMENT DATA FOR USER DOMAIN

(75) Inventors: So-young Jeong, Seoul (KR); Gun-wook Kim, Goyang-si (KR); Kyung Park, Daejeon-si (KR)

(73) Assignee: Pantech Co., Ltd., Seoul (KR)

(*) Notice: Subject to any disclaimer, the term of this patent is extended or adjusted under 35 U.S.C. 154(b) by 983 days.

(21) Appl. No.: 11/841,190

(22) Filed: Aug. 20, 2007

(65) Prior Publication Data

US 2008/0046271 A1    Feb. 21, 2008

(30) Foreign Application Priority Data

Aug. 21, 2006  (KR) .................. 10-2006-0079066
Oct. 9, 2006   (KR) .................. 10-2006-0098167
Oct. 18, 2006  (KR) .................. 10-2006-0101531

(51) Int. Cl.
G06F 21/00    (2013.01)
H04L 29/06    (2006.01)
G06F 21/10    (2013.01)

(52) U.S. Cl.
CPC .............. H04L 63/102 (2013.01); G06F 21/10 (2013.01)

(58) Field of Classification Search
CPC ...................................................... G06F 21/00
USPC .......................................................... 705/59
See application file for complete search history.

(56) References Cited

U.S. PATENT DOCUMENTS

| | | |
|---|---|---|
| 2002/0157002 A1 | 10/2002 | Messerges et al. |
| 2003/0018491 A1 | 1/2003 | Nakahara et al. |
| 2004/0062400 A1 | 4/2004 | Sovio et al. |
| 2004/0103312 A1 | 5/2004 | Messerges et al. |
| 2005/0120246 A1 | 6/2005 | Jang et al. |
| 2006/0020784 A1 | 1/2006 | Jonker et al. |
| 2006/0179303 A1 | 8/2006 | Gurleyen et al. |
| 2006/0242428 A1 | 10/2006 | Tarkkala |
| 2006/0253398 A1 | 11/2006 | Kim et al. |

(Continued)

FOREIGN PATENT DOCUMENTS

| | | |
|---|---|---|
| CN | 1714529 | 12/2005 |
| EP | 1376438 | 1/2004 |

(Continued)

OTHER PUBLICATIONS

"Secure Content Exchange Architecture" Aug. 16, 2006, Open Mobile Alliance. Retrieved from IDS (Sep. 27, 2011).*

(Continued)

*Primary Examiner* — James A Reagan
(74) *Attorney, Agent, or Firm* — H.C. Park & Associates, PLC (57) ABSTRACT

A method for importing Digital Rights Management (DRM) data converts non-Open Mobile Alliance (OMA) DRM data to OMA DRM data for a user domain in DRM solutions. The method includes registering a local rights manager (LRM) to a domain authority or a Rights Issuer and exchanging user domain information, and creating a DRM content format (DCF) and a rights object (RO) that conform to Open Mobile Alliance (OMA) DRM standard from non-OMA DRM data based on the user domain information. A method for using DRM data includes registering the LRM, creating DCF conforming to OMA DRM standard from non-OMA DRM data, creating an RO, and transferring the DCF and RO to a DRM agent of a device.

19 Claims, 8 Drawing Sheets

(56) References Cited

U.S. PATENT DOCUMENTS

| | | | |
|---|---|---|---|
| 2006/0282391 | A1 | 12/2006 | Peterka et al. |
| 2007/0061886 | A1 | 3/2007 | Le |
| 2007/0172065 | A1 | 7/2007 | Lee et al. |
| 2007/0180497 | A1 | 8/2007 | Popescu et al. |
| 2007/0220575 | A1 | 9/2007 | Cooper et al. |
| 2007/0226372 | A1 | 9/2007 | Zwart et al. |
| 2008/0046758 | A1* | 2/2008 | Cha et al. .................. 713/189 |

FOREIGN PATENT DOCUMENTS

| | | |
|---|---|---|
| EP | 1564621 | 8/2005 |
| JP | 2003-323343 | 11/2003 |
| JP | 2005-092851 | 4/2005 |
| JP | 2006-067320 | 3/2006 |
| JP | 2006-067321 | 3/2006 |
| KR | 10-2004-0015714 | 2/2004 |
| KR | 10-0493904 | 6/2005 |
| WO | 2004/074993 | 9/2004 |
| WO | 2005055022 | 6/2005 |
| WO | 2006/129225 | 12/2006 |

OTHER PUBLICATIONS

European Search Report dated Jan. 31, 2008.

David W. Kravitz, et al.; "Achieving Media Portability through Local Content Translation and End-to-End Rights Management;" Association for Computing Machinery; ACM Workshop on Digital Rights Management; Nov. 7, 2005; Alexandria, VA, pp. 27-36.

Reihaneh Safavi-Naini, et al.; "Import/Export in Digital Rights Management;" Association for Computing Machinery; ACM Workshop on Digital Rights Management; Oct. 25, 2004; Washington, DC, pp. 99-110.

Thomson Multimedia; "SmartRight Contribution to Rights Management & Protection Specifications;" Retrieved from the Internet on Dec. 15, 2004: URL:http://www.tv-anytime.org; May 22, 2002; Section 2.5.2, Version 1.0.

OMA; "Secure Content Exchange Architecture;" OMA Standard; Retrieved from the Internet on Jan. 21, 2008: URL:http://member.openmobilealliance.org; Aug. 3, 2006; Draft Version 0.3.

Open Mobile Alliance, DRM Specification, Approved Version 2.0, Mar. 3, 2006, p. 1-142.

Open Mobile Alliance, Secure Content Exchange Requirements, Candidate Version 1.0, Oct. 20, 2006, p. 1-37.

Final Office Action of U.S. Appl. No. 11/841,178 issued on Mar. 18, 2011.

US Non-Final Office Action issued Oct. 18, 2011 for corresponding U.S. Appl. No. 11/841,178.

OMA, "Secure Content Exchange Architecture," Open Mobile Alliance Draft Version 0.2, Aug. 16, 2006, pp. 1-12, OMA-AD-SCE-V0_2-20060816-D.

Meihua et al., "OMA DRM Scheme System Architecture Analysis", TRS software development laboratory, Beijing Information Engineering College, Beijing 100101 and Information Processing Institute, Xidian University of Science and Technology, Shanxi 710071, pp. 5-8.

The Office Action of Jun. 8, 2011 in Chinese patent application No. 200710182176.3.

European Search Report dated Sep. 7, 2007.

OMA (Open Mobile Alliance): "Combining Domain and User Domain", Change Request, [Online], Mar. 29, 2006, pp. 1-3, XP002448280.

Non-Final Office Action issued on May 14, 2010 in U.S. Appl. No. 11/738,639.

Final Office Action issued on Oct. 28, 2010 in U.S. Appl. No. 11/738,639.

Office action issued on Sep. 20, 2010 in U.S. Appl. No. 11/841,178.

Open Mobile Alliance Ltd. "Secure Content Exchange Architecture," Open Mobile Alliance Draft Version 0.2, Aug. 16, 2006, pp. 8-9, OMA-AD-SCE-V0_2-20060816-D.

European Office Action for European Patent Application No. 07 253 315.1 dated May 22, 2012.

Final Office Action issued for related U.S. Appl. No. 11/841,178 dated May 10, 2012.

Non-Final Office Action of U.S. Appl. No. 11/738,639 dated Jul. 13, 2012.

* cited by examiner

FIG.1

CONVENTIONAL ART

FIG.2

CONVENTIONAL ART

FIG.3

CONVENTIONAL ART

FIG.4

CONVENTIONAL ART

FIG.5

CONVENTIONAL ART

METHOD FOR IMPORTING DIGITAL RIGHTS MANAGEMENT DATA FOR USER DOMAIN

CROSS REFERENCE TO RELATED APPLICATIONS

This application claims priority from and the benefit of Korean Patent Application No. 10-2006-0079066, filed on Aug. 21, 2006, Korean Patent Application No. 10-2006-0098167, filed on Oct. 9, 2006, and Korean Patent Application No. 10-2006-0101531, filed on Oct. 18, 2006, which are hereby incorporated by reference for all purposes as if fully set forth herein.

BACKGROUND OF THE INVENTION

1. Field of the Invention

The present invention relates to Digital Rights Management, and more specifically to a method for importing Digital Rights Management data to convert non-Open Mobile Alliance Digital Rights Management data into Open Mobile Alliance Digital Rights Management data for a user domain.

2. Discussion of the Background

With the increase of devices capable of delivering multimedia content to a user, a user may own, operate, or maintain control or responsibility over several devices, such as a networked home media center entertainment system and handheld devices with varying degrees of network connectivity. The handheld devices may include a mobile phone and a portable music player. The network connectivity may include, for example, wireless connectivity through a mobile phone or a wired broadband internet connection through a personal computer. The user may purchase and download content, such as multimedia content, or programs for operation on one device over the network connection.

However, the user may also wish to operate the content or programs on other devices owned by the user. Therefore, according to the Open Mobile Alliance (OMA) Digital Rights Management (DRM) Secure Content Exchange (SCE) Requirements (hereinafter, referred to as "OMA SCE Requirements"), suggested by OMA Mobile application software standardization organization, which is incorporated herein by reference, and which established the concept of a "user domain," the user may establish a user domain. A user domain may include other devices owned, operated, controlled, or under the responsibility of the user. The user may add devices to the user domain, and may use a device in the user domain to obtain content useable in the user domain. Further, the user may share content between devices in the user domain via network connectivity or via storage memory suitable for transferring content between devices, such as Secure Removable Media (SRM). Alternatively, such as where content is streamed over a network connection, the user may share authorization to stream the content with other devices in the user domain. This may be achieved by sharing, for example, user tokens associated with the authorization.

Thus, user domain refers to the group of devices that may share DRM content. A device may include any device that may share DRM content within the user domain. User domain management may include such management tasks as adding devices to and removing devices from the user domain, and application of domain policy.

Thus, a content provider may allow replication and use of content among devices in the user's user domain. Further, the content provider may limit and/or prohibit distribution and use of such content to devices outside the user domain.

A user domain may be created by a user through the operation of one device in the user domain with network connectivity. For example, a user may create a user domain by operating a device to view a list of possible domain policies. Various domain policies may be developed, and one of which may be selected by a user as most appropriate for that user. An SCE enabler may support only a single domain policy for a user domain. Domain policies for user domains, issued by a Domain Authority (DA), may include such constraints as the maximum number of devices in the user domain, temporal restrictions on the use of content, or frequency of the use of content.

The DA may provide the selected domain policy and a Domain Key (DK) to a Domain Enforcement Agent (DEA) stored in the user's device. The device, through the DEA, may create and manage the user's user domain.

The user may then add other devices to the user domain. For example, a user may connect a mobile phone, portable music player, and a Home Media Center to the device and add these devices to the user domain. The domain policy issued by the DA may limit the number of devices that may be added to the user domain, and the DEA may prevent the number of devices added to the user domain from exceeding this limit.

When a user acquires content with a user domain Rights Object (RO), the user may wish to share the content with the devices in the user domain or with devices outside the user domain. The user may then connect the connected device to other devices in the user domain to transfer copies of the content and its corresponding RO to other devices in the user domain.

An SCE enabler may enable a rights issuer (RI), which may exchange a Content Encryption Key (CEK) with a content issuer, to specify usage permissions for consumption of rights on and transfer of rights between devices that are in the user domain. Usage permissions may include permissions to play, copy, and/or move content among devices in the user domain. An SCE enabler may also enable an RI to specify usage permissions for rights among devices outside the user domain. Usage permissions may include permissions to copy and move content to devices outside the user domain. Alternately, usage permissions may prohibit devices in the user domain from copying or moving content to devices outside the user domain.

Thus, the OMA SCE Requirements introduced the concept of "user domain" so that a user can directly perform user domain management instead of performing user domain management through an RI. Therefore, OMA SCE Requirements also introduced the concept of DA and DEA so that defining and describing a domain policy can be performed by the DA and enforcement of the domain policy can be performed by the DEA. The DA and DEA may be separate entities or may be integrated into a single entity.

A DA may define and describe the domain policy and may deliver such domain policy to the DEA. The DEA may receive the domain policy from the DA, and may define and manage the user domain based on the received domain policy. That is, the user domain generated by the DEA is also managed by the DEA. If the DA and DEA are integrated as a single entity, the DA may define the user domain and may perform domain management without interfacing with a separate DEA.

Figure 1:
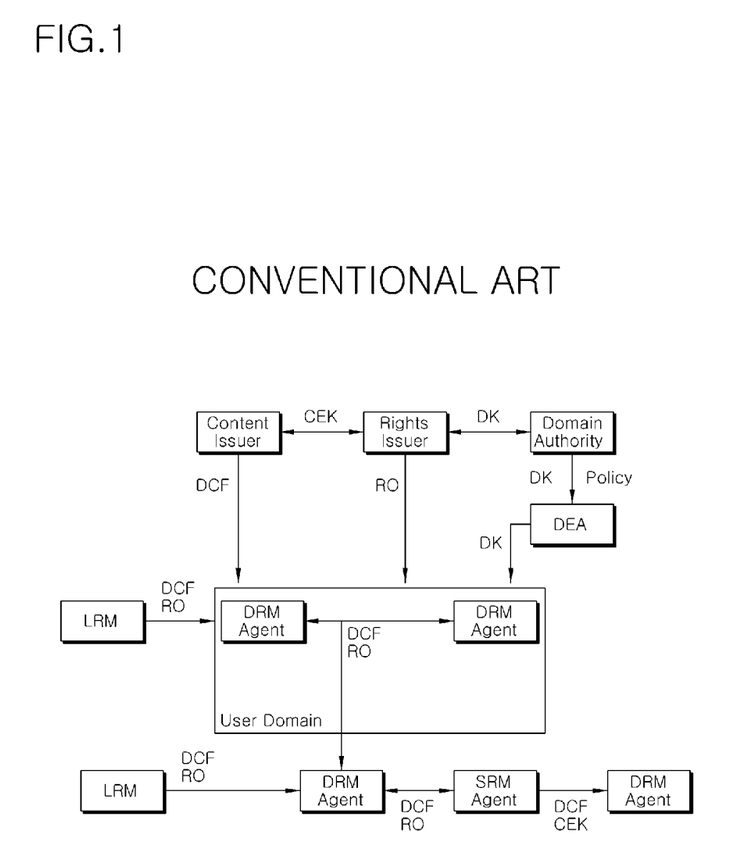
FIG. 1 illustrates a schematic diagram of OMA SCE Requirements.

FIG. 1 illustrates a schematic diagram of the OMA SCE Requirements.

Unlike the traditional OMA DRM V2.0 standard (hereinafter, referred to as "OMA DRM V2.0"), which is also incorporated by reference and which antedates the OMA SCE Requirements, the OMA SCE Requirements include:

(1) Import function by a Local Rights Manager (LRM);
(2) User Domain function by the DA and the DEA; and
(3) Move function to move RO from one device to another device.

Hereinafter, the Import function and User Domain function will be described in more detail.

OMA SCE Requirements provide an Import function that may be performed by the LRM. Import function refers to converting non-OMA DRM data into OMA DRM data.

For example, a device compatible with OMA DRM may attempt to play non-OMA DRM data. In this case, the non-OMA DRM data should be converted or imported into OMA DRM data by an LRM according to OMA SCE Requirements. Thus, the LRM imports the non-OMA DRM data into DRM Content Format (DCF) and imports an RO for the OMA DRM, which are called "Imported DCF" and "Imported RO," respectively. Imported DCF and Imported RO, which support OMA DRM, can be used by a DRM agent in a device compatible with OMA DRM according to OMA SCE Requirements.

As described above, user domain permits a user to perform user domain management for a number of devices included in the user domain instead of performing user domain management for each device through a rights issuer (RI), as was established in the traditional OMA DRM V2.0 standard.

Other features of the traditional OMA DRM V2.0 standard are compatible with OMA SCE Requirements, however. For example, OMA DRM V2.0 includes a 4-pass registration protocol and 2-pass rights object (RO) acquisition protocol for a device to acquire an RO.

Figure 2:
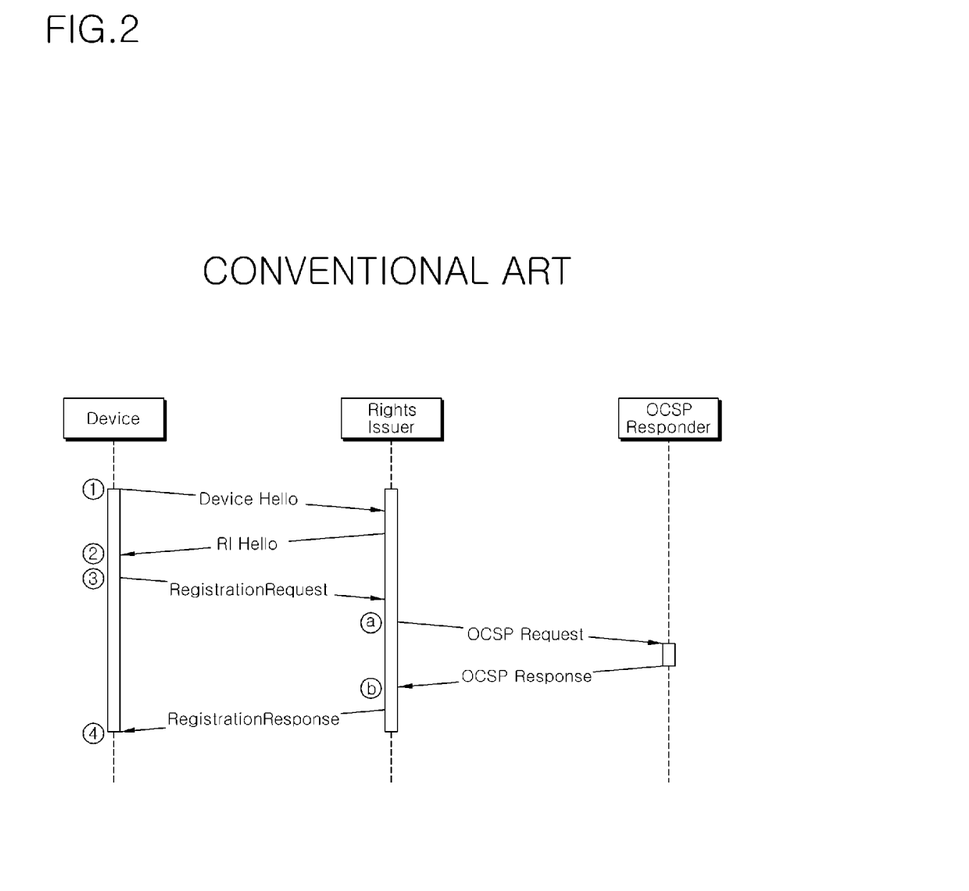
FIG. 2 illustrates a 4-pass registration protocol according to OMA DRM V2.0.

FIG. 2 illustrates a 4-pass registration protocol according to OMA DRM V2.0.

The 4-pass registration protocol permits the device and the RI to exchange and register information to each other. If the protocol is successful, the device can possess RI context, which contains information about the RI, and the RI can possess information about the device.

According to the 4-pass registration protocol, the device first transfers a Device Hello message including device information to the RI. The Device Hello message may contain protocol version, device ID, and supported cipher algorithms for the device.

The RI transfers an RI Hello message including RI information to the device in the second stage. The RI Hello message contains transfer result, session ID, protocol version, RI ID, supported algorithm, and other verification and server information.

The device then transfers a RegistrationRequest message to the RI to register the device with the RI in the third stage. The RegistrationRequest message contains verification data, such as session ID, message transfer time, certificate and signature, and nonce.

The RI finally transfers a RegistrationResponse message to the device in the fourth stage. This RegistrationResponse message contains verification data, such as device registration result, session ID, RI certificate/digital signature, and Online Certificate Status Protocol (OCSP) Response, which may be sent to the RI in response to an OCSP Request message that may be sent from the RI to an OCSP Responder upon certain contingencies that will not be described in further detail.

Figure 3:
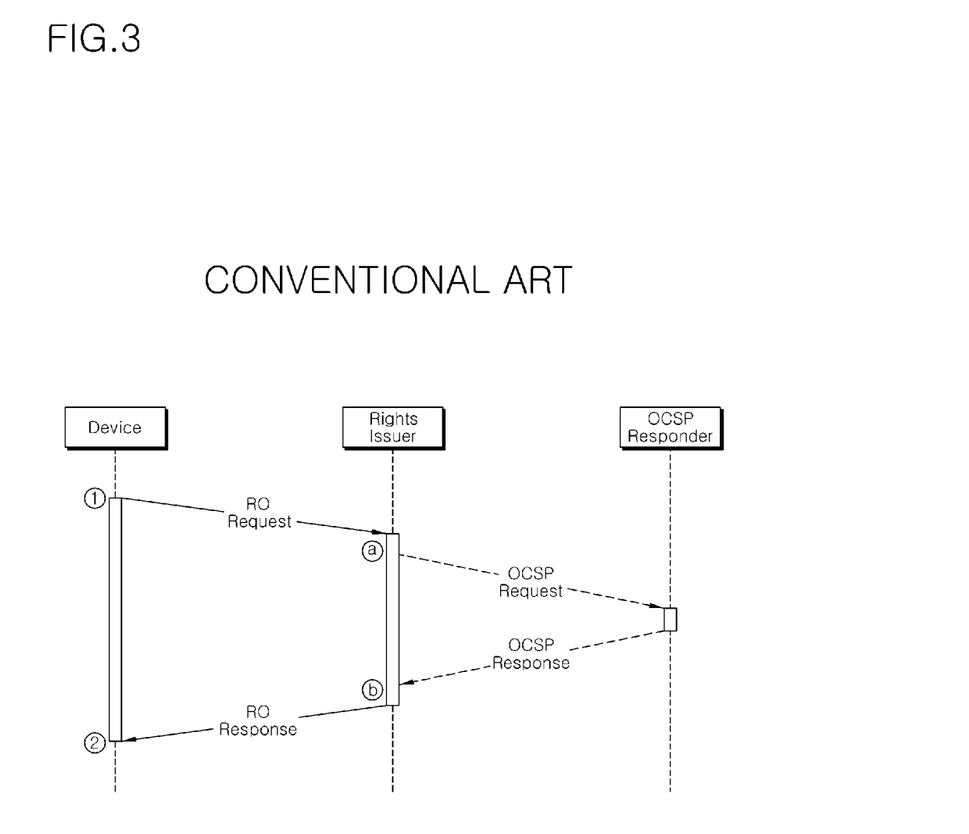
FIG. 3 illustrates a 2-pass RO acquisition protocol according to OMA DRM V2.0.

FIG. 3 illustrates a 2-pass RO acquisition protocol according to OMA DRM V2.0.

The 2-pass RO acquisition protocol is performed to acquire RO following the 4-pass registration protocol. On the basis of RI context resulting from performing the 4-pass registration protocol, the device receives RO from the RI by sending a RORequest message to the RI, and by receiving the ROResponse message from the RI. Additionally, an OCSP Response may be sent to the RI in response to an OCSP Request message sent from the RI to an OCSP Responder upon certain contingencies.

Figure 4:
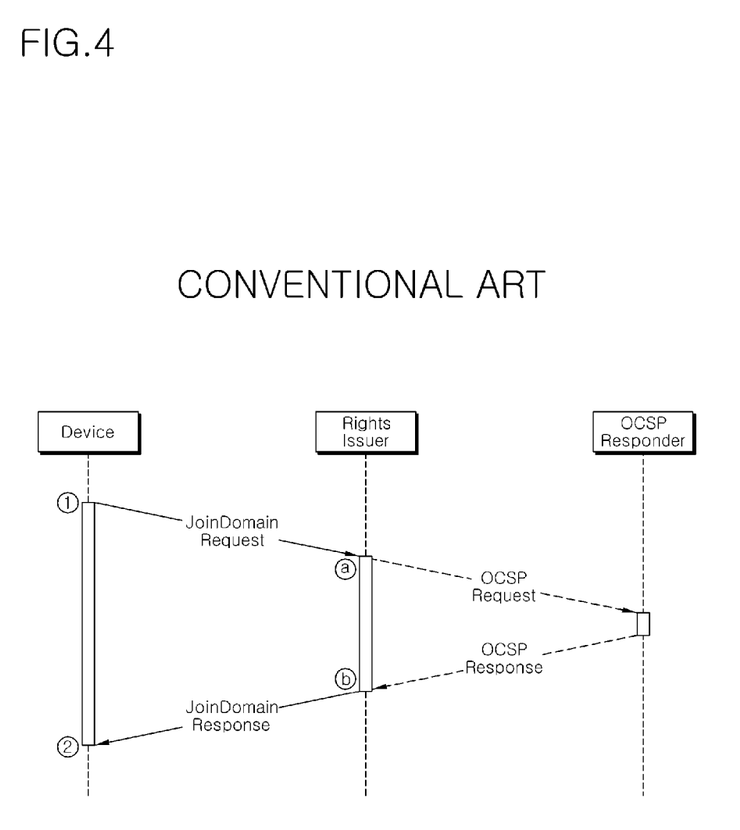
FIG. 4 illustrates a 2-pass join domain protocol according to OMA DRM V2.0.

Additionally, the device may be registered with a corresponding user domain. FIG. 4 illustrates a 2-pass join domain protocol according to OMA DRM V2.0.

The 2-pass join domain protocol is used by a device supporting OMA DRM V2.0 to use domain-based RO. In this case, the device can use the domain-based RO after joining a corresponding domain using the 2-pass join domain protocol. The 2-pass join domain protocol is generally operated only after the 4-pass registration protocol occurs. Once joined, the device can use the RO through the process shown in FIG. 5.

Figure 5:
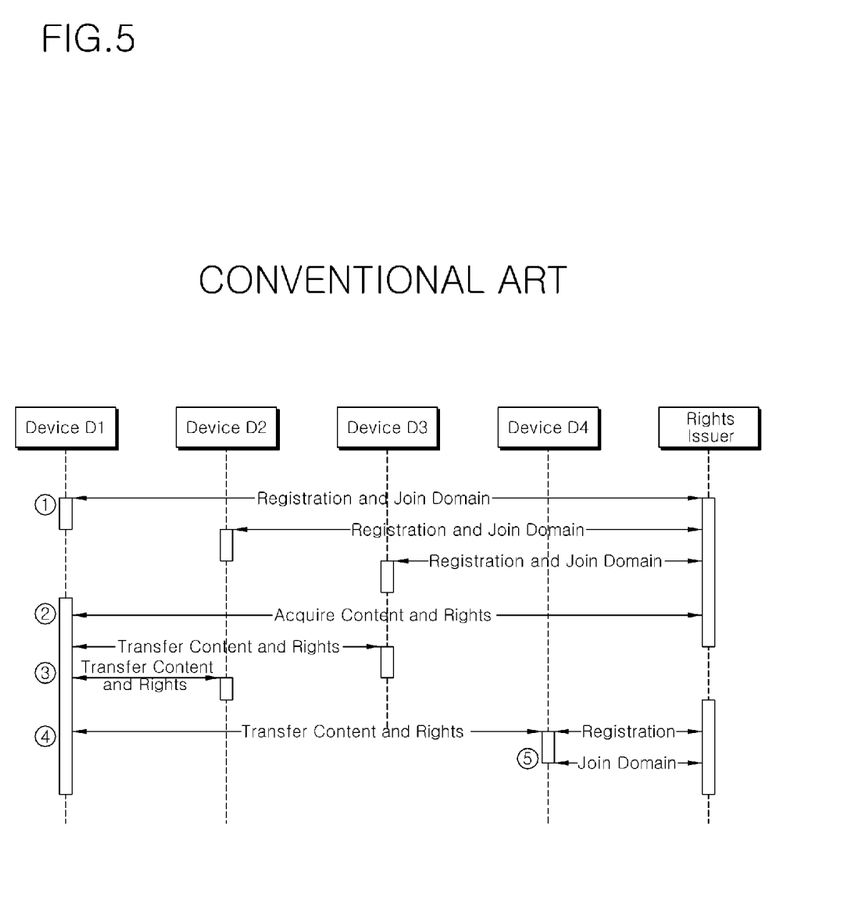
FIG. 5 illustrates a method for using RO by a device according to OMA DRM V2.0.

FIG. 5 illustrates a method for using RO by a device according to OMA DRM V2.0.

At the first stage, devices D1, D2, and D3 join a domain using the 4-pass registration protocol as shown FIG. 2 and the 2-pass join domain protocol as shown in FIG. 4. At the second stage, the device D1 acquires the RO from the RI through the 2-pass RO acquisition protocol as shown in FIG. 3. At the third stage, the acquired RO is transferred from device D1 to the devices D2 and D3. Since the devices D2 and D3 joined the same domain as the device D1, the devices D2 and D3 can use the RO received from the device D1. At the fourth stage, the device D1 transfers the RO to the device D4, which has not joined the same domain as device D1. Since the device D4 has not joined the domain, the device D4 joins the domain through the 2-pass join domain protocol at the fifth stage and uses the RO received from the device D1.

However, the OMA SCE Requirements do not describe a method for importing and changing non-OMA DRM data to OMA DRM data by LRM, or a method which allows the DRM agent belonging to the user domain to use the imported OMA DRM data.

SUMMARY OF THE INVENTION

This invention provides method for importing DRM data to convert non-OMA DRM data into OMA DRM data.

This invention also provides a method for using imported DRM data by acquiring an imported RO by a DRM agent from a DA or from an RI.

Additional features of the invention will be set forth in the description which follows, and in part will be apparent from the description, or may be learned by practice of the invention.

The present invention discloses a method for importing of digital rights management (DRM) data, including registering a local rights manager (LRM) with a domain authority (DA), exchanging user domain information, and creating a DRM content format (DCF) and a rights object (RO) from non-Open Mobile Alliance (OMA) DRM data based on the user domain information, the DCF and RO conforming to an OMA DRM standard.

The present invention also discloses a method for using digital rights management (DRM) data, including registering a local rights manager (LRM) with a domain authority (DA), exchanging user domain information, creating a DRM content format (DCF) from non-Open Mobile Alliance (OMA) DRM data based on the user domain information, the DCF conforming to an OMA DRM standard; creating a rights object (RO) for a user domain by a rights issuer (RI), and transferring the DCF from the LRM to a DRM agent of a device.

The present invention also discloses a method for importing digital rights management (DRM) data, including registering a local rights manager (LRM) with a rights issuer (RI), exchanging user domain information, and creating a DRM content format (DCF) and a rights object (RO) from non-Open Mobile Alliance (OMA) DRM data based on the user domain information, the DCF and the RO conforming to an OMA DRM standard.

The present invention also discloses a method for using digital rights management (DRM) data, including registering a local rights manager (LRM) with a rights issuer (RI), exchanging user domain information, creating a DRM content format (DCF) from non-Open Mobile Alliance (OMA) DRM data based on the user domain information, the DCF conforming to OMA DRM standard, creating a rights object (RO) for a user domain, exchanging the user domain information between a domain authority (DA) and the RI, and transferring the DCF from the LRM to a DRM agent of a device.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Hereinafter, a method for importing DRM data according to the present exemplary embodiment of the invention will be described. The method for importing DRM data according to the present exemplary embodiment of the invention uses protocols operating in a similar manner to the above-described protocols described in the OMA DRM V2.0 standard.

Figure 6:
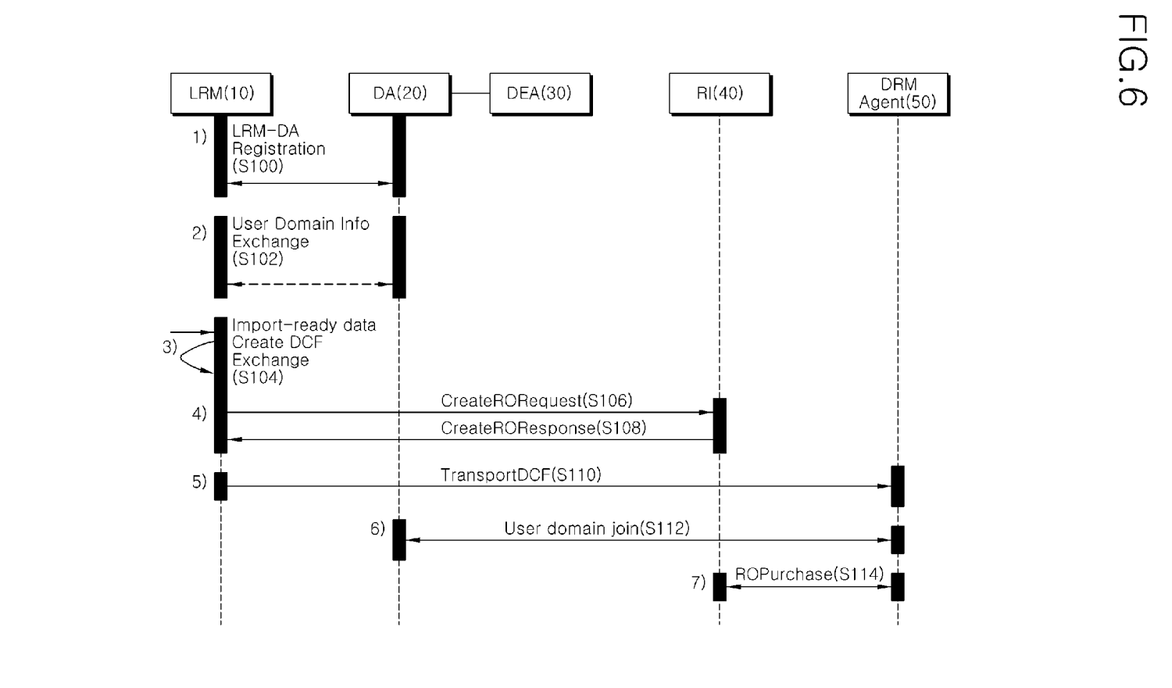
FIG. 6 illustrates a method for importing non-OMA DRM data into OMA DRM data for a user domain according to an exemplary embodiment of the present invention.

FIG. 6 illustrates a method for importing non-OMA DRM data into OMA DRM data for a user domain according to an exemplary embodiment of the present invention. More specifically, FIG. 6 illustrates a method for importing non-OMA DRM data into OMA DRM data for a user domain by an LRM 10 so that a DRM agent 50 of a device belonging to the user domain can use the OMA DRM data.

At the first stage, a registration procedure is performed between the LRM 10 and a DA 20 in operation S100. The registration may be conducted when the LRM 10 first performs the import function for user domain. Additionally, if the registration is expired, the registration may be performed. In more detail, the registration stage performs mutual verification/key exchange, and mutual exchange/confirmation of multiple parameters for post-registration communications. The registration procedure may be implemented using the 4-pass registration protocol between the LRM 10 and the DA 20. That is, the registration stage may be implemented through multiple message exchanges.

At the second stage, user domain information is exchanged in operation S1102. User domain information is exchanged to convert non-OMA DRM data to OMA DRM data for the user domain associated with the DA 20 by the LRM 10.

If OMA DRM data for an existing user domain is needed, the LRM 10 receives information about the user domain from the DA 20.

Unless a user domain exists, a user domain for the OMA DRM data is allocated through the DA 20, and information about the user domain is transferred to the LRM 10. The user domain information exchange procedure may be implemented through multiple message exchanges.

At the third stage, import-ready data is received to create DRM content format (DCF) in operation S104. The import-ready data refers to non-OMA DRM data that be converted into OMA DRM data. The method for receiving and converting data may be any method for receiving and converting content associated with DRM by the LRM 10.

If the LRM 10 has insufficient information about a user domain when the import-ready data is receiving for conversion into DCF for the user domain, the above-mentioned user domain information exchange procedure may be performed.

At the fourth stage, the RO for the user domain is created from the DCF in operation S106 and operation S108. The LRM 10 transfers CreateRORequest message to the RI 40 in operation S106. The RI 40 transfers CreateROResponse message to the LRM 10 in operation S108.

During these operations, the RI 40 and the LRM 10 exchange information about rights permission and constraints to be included in the RO, and exchange keys used in creating the DCF, and data for the RO creation and safe communications. As a result, the RI 40 creates the RO for user domain, which may be transferred to the LRM 10 at the request of the LRM 10. However, the RI 40 may not transfer the RO to the LRM 10 after the RO is created.

Since the RI 40 uses the user domain information to create the RO, the user domain information is exchanged between the LRM 10 and the RI 40 at the fourth stage. The user domain information includes keys to create the RO and information about related data exchange.

At the fifth stage, the LRM 10 transfers the created DCF to the DRM agent 50 in operation S110.

At the sixth stage, the DRM agent 50 joins the user domain to use the DCF in operation S112. If the DRM agent 50 has joined the user domain before the sixth stage, this stage may not be included.

At the seventh stage, an RO acquisition procedure is performed to acquire RO at the DRM agent 50 in operation S114. The RO acquisition stage may be implemented through multiple message exchanges as described in FIG. 3. However, the seventh stage may not be necessary if the RO is received from the LRM 10. Additionally, if the DRM agent 50 has not joined the user domain when the RO for user domain is acquired, the sixth stage may be performed prior to using the RO.

Figure 7:
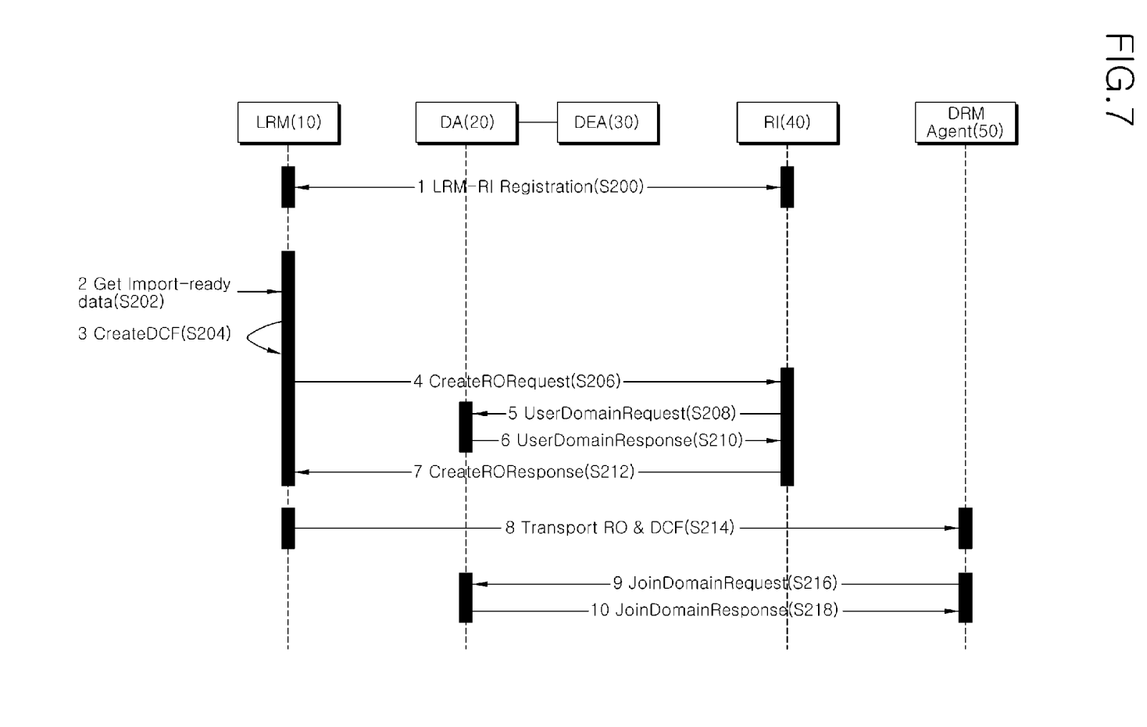
FIG. 7 illustrates a method for importing non-OMA DRM data into OMA DRM data for a user domain according to another exemplary embodiment of the present invention.

FIG. 7 illustrates a method for importing non-OMA DRM data into OMA DRM data for a user domain according to another exemplary embodiment of the present invention. The present exemplary embodiment includes exchanging meta information, or user domain information, between the DA 20 and the RI 40 in operation S208 and operation S210.

At the first stage, a registration procedure between the LRM 10 and the RI 40 is performed in operation S200. The registration may be conducted when the LRM 10 first performs the import function for the user domain. Additionally, if the registration is expired, the registration may be performed. In more detail, the registration stage performs mutual verification/key exchange, and mutual exchange/confirmation of multiple parameters for post-registration communications. The registration procedure may be implemented using the 4-pass registration protocol between the LRM 10 and the RI 40. That is, the registration stage is implemented through multiple message exchanges.

At the second stage, the import-ready data is received at the LRM 10 to create DCF in operation S202. The import-ready data refers to non-OMA DRM data that be converted into OMA DRM data. The method for receiving and converting data may be any method for receiving and converting content associated with DRM by the LRM 10.

At the third stage, DCF is created in operation S204. At the fourth stage, the LRM 10 transfers a CreateRORequest message to the RI 40 in operation S206. At the fifth stage, the RI 40 transfers a UserDomainRequest message to the DA 20 to request transfer of user domain information from the DA 20 in operation S208. At the sixth stage, the DA 20 transfers a UserDomainResponse message having the user domain information to the RI 40 in operation S210.

A method for registering the RI 40 and the DA 20, which may be performed in advance of the fifth stage and the sixth stage described above, is disclosed and claimed in the application Ser. No. 11/841,178, which is filed concurrently with the present application, and is assigned to the same assignees of the present application.

At the seventh stage, the RI 40 creates the RO according to the user domain information and transfers a CreateROResponse message to the LRM 10 in operation S212. The RI 40 may also transfer the RO to the LRM 10 in operation S212.

At the eighth stage, the LRM 10 transfers the DCF and the RO to the DRM agent 50 in operation S214. Thus, in contrast with the previous exemplary embodiment, the DRM agent 50 receives the RO from the LRM 10 rather than from the RI 40.

At the ninth stage, the DRM agent 50 sends a JoinDomainRequest message to the DA 20 to join the user domain and use the DCF in operation S216, and at the tenth stage, the DA 20 sends a JoinDomainResponse message to the DRM agent 50 in operation S218. If the DRM agent 50 already has joined the user domain, this ninth stage and tenth stage may not be included.

Figure 8:
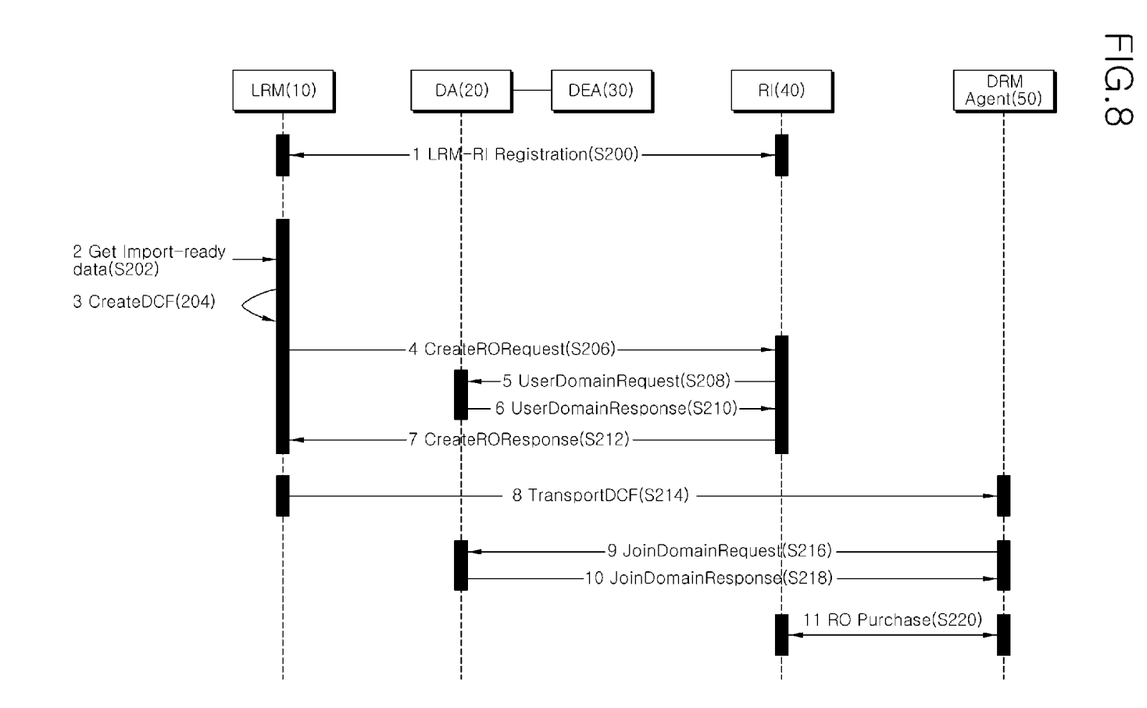
FIG. 8 illustrates a method for importing non-OMA DRM data into OMA DRM data for a user domain according to another exemplary embodiment of the present invention.

FIG. 8 illustrates a method for importing non-OMA DRM data into OMA DRM data for a user domain according to another exemplary embodiment of the present invention. The first stage, second stage, third stage, fourth stage, fifth stage, sixth stage, and seventh stage are the same or substantially similar as those stages described above for FIG. 7.

At the eighth stage, the DCF is transferred from the LRM 10 to the DRM agent 50. However, RO associated with the transferred DCF is not transferred to the DRM agent 50. Therefore, to use the DCF, a RO acquisition procedure at the eleventh stage is included as shown in FIG. 8. The RO acquisition stage may be implemented as described in FIG. 3. If the DRM agent 50 has not joined the user domain when the RO is acquired, the ninth stage and tenth stage, as described above for FIG. 7, may be performed prior to using the RO.

The above-described exemplary embodiments for importing DRM data may be modified.

For example, the second stage of FIG. 6 may be performed after the third stage of FIG. 6.

In addition, the sixth stage of FIG. 6 and the ninth and tenth stages of FIG. 7 and FIG. 8 may be omitted if the DRM agent 50 of the current device has already joined the user domain.

In addition, the seventh stage of FIG. 6 and the eleventh stage of FIG. 8 may be omitted if the RO has been transferred together with the DCF at an earlier stage.

Furthermore, the join domain procedure may be performed after the RO acquisition procedure.

As apparent from the above description, it is possible to play non-OMA DRM data by a device supporting OMA DRM standards.

In addition, if non-OMA DRM data is converted into OMA DRM data, the DRM agent can acquire the converted RO not only directly from the LRM but also from an RI.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for importing digital rights management (DRM) data, comprising:
   registering a local rights manager (LRM) with a domain authority (DA);
   exchanging, between the LRM and the DA, user domain information comprising meta information, wherein the meta information is used to acquire for acquiring DRM data for a user domain from non-Open Mobile Alliance (OMA) DRM data;
   creating, by the LRM, a DRM content format (DCF) from the non-OMA DRM data based on the user domain information, the DCF conforming to an OMA DRM standard;
   exchanging, between the LRM and a rights issuer (RI), the user domain information and a key used in creating the DCF; and
   receiving, at the LRM from the RI, a rights object (RO) based on the user domain information, the RO conforming to the OMA DRM standard.

2. The method of claim 1, wherein exchanging the user domain information comprises exchanging the meta information for acquiring DRM data for a user domain from the non-OMA DRM data.

3. The method of claim 1, wherein registering comprises:
   transferring LRM information to the DA;
   transferring DA information to the LRM;

creating registration information based on the DA information, and transferring the registration information to the DA; and registering the LRM based on the registration information, and transferring a registration result to the LRM.

4. A method for using digital rights management (DRM) data, comprising:
    registering a local rights manager (LRM) with a domain authority (DA);
    exchanging user domain information comprising a first key to create a rights object (RO);
    creating, by the LRM, a DRM content format (DCF) from non-Open Mobile Alliance (OMA) DRM data based on the user domain information, the DCF conforming to an OMA DRM standard;
    exchanging, between the LRM and a rights issuer (RI), a second key used in creating the DCF;
    creating an RO for a user domain by the RI using the first key; and
    transferring the DCF from the LRM to a DRM agent of a device.

5. The method of claim 4, further comprising:
    acquiring the RO for the user domain by the DRM agent.

6. The method of claim 5, wherein the DRM agent acquires the RO from one of the group consisting of the LRM and the RI.

7. The method of claim 4, further comprising:
    transferring the RO from the RI to the LRM.

8. The method of claim 4, wherein registering comprises:
    transferring LRM information to the DA;
    transferring DA information to the LRM;
    creating registration information based on the DA information, and transferring the registration information to the DA; and
    registering the LRM based on the registration information, and transferring a registration result to the LRM.

9. The method of claim 4, further comprising:
    sending a join domain request message from the DRM agent to join the DRM agent in the user domain.

10. A method for importing digital rights management (DRM) data, comprising:
    registering a local rights manager (LRM) with a rights issuer (RI);
    exchanging, between the LRM and the RI, user domain information comprising meta information for acquiring DRM data for a user domain from non-Open Mobile Alliance (OMA) DRM data;
    creating, by the LRM, a DRM content format (DCF) from the non-OMA DRM data based on the user domain information, the DCF conforming to an OMA DRM standard;
    exchanging, between the LRM and the RI, a key used in creating the DCF; and
    receiving, at the LRM from the RI, a rights object (RO) based on the user domain information, the RO conforming to the OMA DRM standard.

11. The method of claim 10, wherein exchanging the user domain information comprises exchanging the meta information for acquiring DRM data for a user domain from the non-OMA DRM data.

12. The method of claim 10, wherein registering comprises:
    transferring LRM information to the RI;
    transferring RI information to the LRM;
    creating registration information based on the RI information, and transferring the registration information to the RI; and
    registering the LRM based on the registration information, and transferring a registration result to the LRM.

13. A method for using digital rights management (DRM) data, comprising:
    registering a local rights manager (LRM) with a rights issuer (RI);
    exchanging user domain information comprising meta information for acquiring DRM data for a user domain from non-Open Mobile Alliance (OMA) DRM data;
    creating, by the LRM, a DRM content format (DCF) from the non-OMA DRM data based on the user domain information, the DCF conforming to OMA DRM standard;
    exchanging, between the LRM and the RI, a key used in creating the DCF;
    creating, by the RI, a rights object (RO) for a user domain;
    exchanging the user domain information between a domain authority (DA) and the RI; and
    transferring the DCF from the LRM to a DRM agent of a device.

14. The method of claim 13, wherein exchanging user domain information between the DA and the RI comprises exchanging the meta information for acquiring DRM data for the user domain from the non-OMA DRM data.

15. The method of claim 13, further comprising:
    acquiring the RO for the user domain by the DRM agent.

16. The method of claim 15, wherein the DRM agent acquires the RO from one of the group consisting of the RI and the LRM.

17. The method of claim 13, further comprising:
    transferring the RO from the RI to the LRM.

18. The method of claim 13, wherein registering comprises:
    transferring LRM information to the RI;
    transferring RI information to the LRM;
    creating registration information based on the RI information, and transferring the registration information to the RI; and
    registering the LRM based on the registration information, and transferring a registration result to the LRM.

19. The method of claim 13, further comprising:
    sending a join domain request message from the DRM agent to join the DRM agent in the user domain.

* * * * *